Patented Feb. 9, 1954

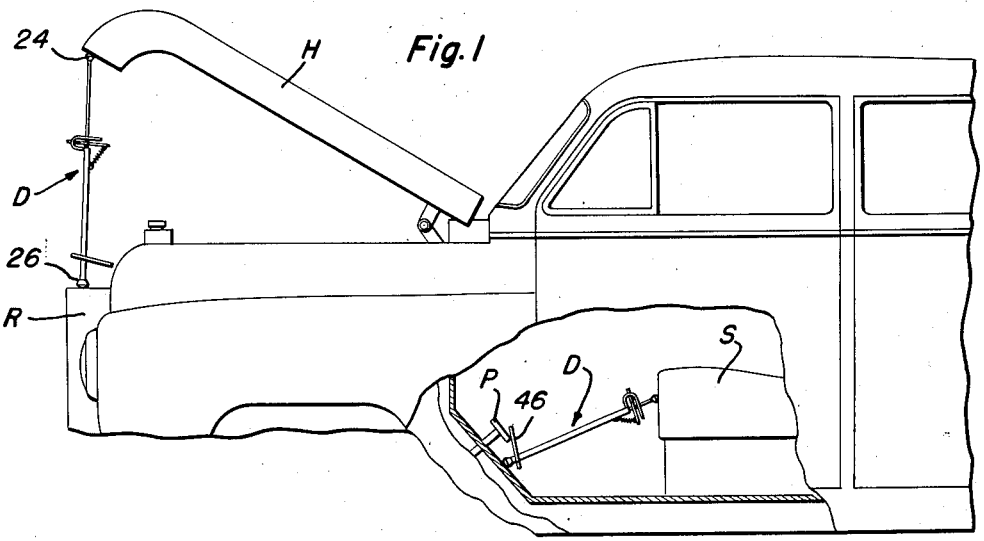
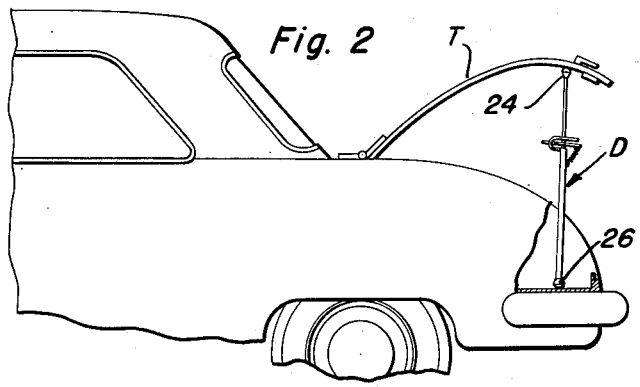
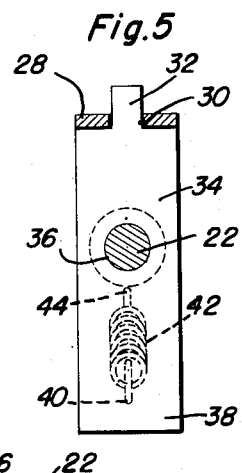
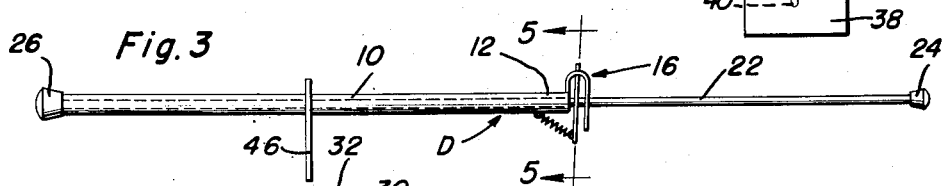
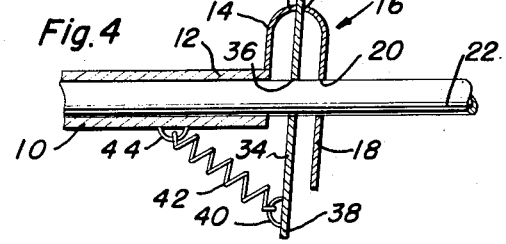
Hjalmer J. Hawkins
INVENTOR.

2,668,458

UNITED STATES PATENT OFFICE 2,668,458

PEDAL EXTENSION

Linus E. Russell, Springfield, Ohio, assignor to Peters & Russell, Inc., Springfield, Ohio, a corporation of Ohio Application March 2, 1951, Serial No. 213,554

11 Claims. (Cl. 74—562.5)

This invention relates to pedal extensions, and more particularly to extensions for brake pedals in automobiles having no clutch pedal, it being the object of the extension to allow for convenient operation of the brake pedal by either foot of the driver.

Thus the object of the invention is to simplify the construction as well as the means and mode of operation of pedal extensions, whereby such extensions may not only be economically manufactured, but will be more efficient in use, adaptable to pedals of differing sizes, having relatively few parts, easily installed, and be unlikely to get out of repair.

A further object of the invention is to present a simple and inexpensive device which can be purchased and installed as an accessory or which can be built into the automobile as an integral part thereof.

Another object of the invention is to provide for easy installation of the device without the exercise of any special skill.

A further object of the invention is to make the device applicable to more than one style of brake pedal pad.

A further object of the invention is to provide a pedal extension possessing the advantageous structural features, the inherent meritorious characteristics and the mode of operation herein described.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing, wherein is found the preferred but obviously not the only embodiment of the invention, Fig. 1 is a view of the extension in front elevation as installed on a pedal;

Fig. 2 is an exploded view in cross section of the two plate elements making up the extension;

Fig. 3 is a top plan view of one of the elements of Fig. 2, Fig. 3 being enlarged with respect to Figs. 1 and 2; and Fig. 4 is a plan view of the other element of Fig. 2.

Like parts are indicated by similar characters of reference throughout the several views.

Referring to the drawings, a brake pedal comprises, as shown in Fig. 1, an arm or rod portion 10, flat or rectangular in cross section, and a pad portion 11 fixed to the outer end of the rod portion and lying at right angles thereto.

The pedal extension is in the form of a two-part metallic case, being made up of first and second plates 12 and 13 having upturned edges to give the plates a recessed formation. The plates are substantially the same in their lateral and longitudinal dimensions, except that, as shown in Fig. 2, the plate 13 is somewhat smaller than the plate 12 so as to be received in telescoping relation in the larger plate. In one direction the plates 12 and 13 slightly exceed the dimension of the pedal pad, while in the other direction the plates substantially exceed the dimension of the pedal.

The case defined by the plates 12 and 13 is adapted and arranged to enclose the pad portion 11 of the pedal. The plate 13 represents the lower part of the case, and, as such, is provided with a T-slot 14 extending from one side edge thereof to accommodate the rod portion 10 of the pedal.

Both plates, being designed for manufacture as relatively thin metal stampings may for strengthening purposes have elongated, transverse ribs therein, indicated respectively at 15 and 16. Also formed in the plates 12 and 13 are corresponding aligned sets of holes for the mounting of fastening devices in adjacent relationship to the side edges of the pad portion of the pedal.

With the view of making the extension device applicable to either of two popular styles of brake pedals, the mounting holes referred to are provided in a first set 17—20 and a second set 21—23. The set 17—20 is arranged for use with the comparatively long and narrow type of pedal, while the set 21—23 is arranged for use with a shorter and wider pedal. The mounting holes receive bolts 24, the positions of the sets of holes being such that the bolts when installed lie in adjacent relationship to the edges of the pedal pad. The bolt holes in the upper plate 12 are countersunk so that the heads of the bolts 24 may lie flush with the surface of the plate.

Both sets of bolt holes are offset toward one side of the plates, as seen in Figs. 3 and 4, with the result that a large portion of the extension will project laterally of the pedal pad when the extension is installed as above described.

In the installation of the extension the lower plate 13 is applied first at right angles to the position shown in Fig. 1 so that the rod 10 may be received in the slot 14. When the inner end or T-shaped portion of the slot is reached by the rod 10, the plate 13 is swung to the position of Fig. 1 and then moved upward to receive the pedal pad. The upper plate 12 is simply slipped over the top of the pad, with the upturned side wall thereof embracing the pad and the corresponding wall of the plate 13. The mounting of the bolts 24 interconnects the plates and it will be understood that the bolts are adjustable, with respect to underlying nuts (not shown) so that the plates may at will be tightened and loosened upon the pedal pad.

Relative motion of the extension is limited by the slot 14 and inhibited by frictional contact of the respective plates 12 and 13 with the pad. In addition positioning devices are provided in the form of inwardly projecting dimples 25 on the under plate 13. As shown, there are two of the dimples, so arranged as to engage the pedal pad near an edge thereof in either of the described styles of pads.

The extension assembly will ordinarily be completed by a rubber or some other form of friction covering 26 stretched over the upper plate 12.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A side extension for installation on foot pedals, including a rectangular plate longer and wider than the pedal to which it is applicable and having upturned edges, said plate being engageable with and receiving the foot pedal on one side thereof, another and similarly formed plate engaging and receiving the foot pedal on the opposite side thereof and at the same time receiving the edges of the first said plate whereby said plates cooperate to define a case enclosing the pedal, and fastening devices adjustable to hold the case in assembled relation and in frictional contact with the pedal.

2. An extension for installation on foot pedals including a first recessed plate conforming approximately in general contour to the pedal to which it is applicable but exceeding such pedal in length and width, a second similarly formed plate, said first and second plates being applied to opposite sides of the pedal to enclose it as a case, and aligned sets of holes in said plates to receive fastening devices extending in adjacent relationship to the edges of the pedal, said sets of holes being offset with respect to the center of said plates so as to provide for an eccentric mounting of said plates on the pedal.

3. An extension for installation on foot pedals including a first recessed plate conforming approximately in general contour to the pedal to which it is applicable but exceeding such pedal in length and width, a second similarly formed plate, said first and second plates being applied to opposite sides of the pedal to enclose it as a case, and aligned sets of holes in said plates to receive fastening devices extending in adjacent relationship to the edges of the pedal, there being a plurality of sets of holes in each of said plates for selective use in accordance with the dimensions of the pedal.

4. A side extension for installation on foot pedals, including a first recessed plate slightly exceeding the pedal to which it is applicable in length and substantially exceeding such pedal in width, a second similarly formed plate, said first and second plates being applied to opposite sides of the pedal to enclose it as a case, one of said plates being of a size to be received in the other whereby said plates may be clamped frictionally on the pedal, and aligned sets of holes in said plates to receive fastening devices interconnecting said plates and clamping them upon the pedal, said sets of holes being offset toward one side of the plates and being arranged to extend in adjacent relationship to the edges of the pedal.

5. A side extension according to claim 4, characterized in that said sets of holes comprise a plurality of sets selected for use in accordance with the dimensions of the pedal.

6. A side extension for installation on foot pedals, including first and second recessed plates applied to opposite sides of the pedal to which it is applicable to enclose it as a case, said plates substantially exceeding said pedal in width, sets of holes in said plates arranged to extend in adjacent relationship to the edges of the pedal, said sets of holes being offset toward one side of the plates, and fastening devices in said holes adjustable to hold the case in assembled relation and in frictional contact with the pedal.

7. A side extension according to claim 6, characterized by dimple formations on one of said plates engageable with the pedal to restrict relative sliding motion between the pedal and the case.

8. A side extension for installation on an automobile brake pedal having an upstanding rod portion and a pad portion, said extension including a lower recessed plate of substantially greater width than said pad portion and slotted to allow the plate to be moved in embracing relation to said rod portion to a position of underlying registry with the pad portion, an upper recessed plate of substantially the same dimensions as the lower plate to be applied in overlying relation to the pad portion, aligned sets of holes in said plates for receiving interconnecting fastening devices extending in adjacent relationship to the edges of the pad portion to clamp said plates upon the pad portion, said sets of holes being offset toward one side of the plates and being comprised in a plurality of sets selected for use in accordance with the size of the pad portion.

9. A side extension according to claim 8, characterized by dimple formations on one of said plates arranged to engage the pad portion irrespective of the sets of holes selected for use.

10. A side extension for installation on foot pedals, including a two part case, the parts of the case being respectively applied to the top and bottom of the pedal to which the extension is applicable and substantially exceeding such pedal in width, a plurality of sets of registering holes in said plates offset toward one side of the plates, said sets of holes being arranged to lie in adjacent relationship to the edges of pedals of respectively different shapes, and fastening devices selectively installed in said sets of holes in accordance with the shape of the pedal for holding the case in assembled relation and in frictional contact with the pedal.

11. A side extension for installation on foot pedals, including first and second recessed plates applied to the top and underside of the pedal to which the extension is applicable to enclose it as a case, said plates substantially exceeding said pedal in width, sets of registering holes in said plates arranged to lie in adjacent relationship to the edges of pedals of respectively different shapes, and fastening devices selectively installed in said sets of holes for holding the case in assembled relation and in frictional contact with the pedal.

LINUS E. RUSSELL.

References Cited in the file of this patent

UNITED STATES PATENTS

| Number | Name | Date |
|---|---|---|
| 1,001,504 | Cary | Aug. 22, 1911 |
| 1,255,220 | Petsy | Feb. 5, 1918 |
| 1,292,760 | Grant | Jan. 28, 1919 |
| 1,389,477 | Beeman | Aug. 30, 1921 |
| 1,503,348 | Bruhn | July 29, 1924 |
| 1,506,691 | Thomas | Aug. 26, 1924 |
| 1,810,625 | Ronse | June 16, 1931 |
| 1,814,785 | Broadwell | July 14, 1931 |
| 2,247,503 | Jones | July 1, 1941 |

FOREIGN PATENTS

| Number | Country | Date |
|---|---|---|
| 16,422/28 | Australia | Oct. 25, 1929 |
| 272,719 | Great Britain | June 23, 1927 |
| 379,123 | France | Oct. 25, 1907 |
| 936,544 | France | Feb. 23, 1948 |